United States Patent [19]

Vitale

[11] Patent Number: 4,566,198
[45] Date of Patent: Jan. 28, 1986

[54] TAPE SQUARE

[76] Inventor: Ralph A. Vitale, P.O. Box 15736, Sarasota, Fla. 33579

[21] Appl. No.: 639,677

[22] Filed: Aug. 9, 1984

[51] Int. Cl.[4] .............................................. G01B 3/10
[52] U.S. Cl. ..................................... 33/138; 242/84.8
[58] Field of Search ..................... 33/137 R, 138, 404, 33/405; 242/84.8

[56] References Cited

U.S. PATENT DOCUMENTS

| 208,346 | 9/1878 | Taylor | 33/138 |
|---|---|---|---|
| 1,962,513 | 6/1934 | Lyon | 33/138 |
| 2,240,753 | 5/1941 | Bouchard et al. | 33/138 |
| 3,025,608 | 3/1962 | Hendrix | 33/138 |
| 3,269,015 | 8/1966 | Barker | 33/138 |
| 3,427,721 | 2/1969 | Moll | 33/138 |
| 3,514,863 | 6/1970 | Moll | 33/138 |
| 3,568,319 | 3/1971 | Moll | 33/138 |
| 3,668,781 | 6/1972 | Teter | 33/138 |
| 3,760,766 | 9/1973 | Wopschall | 33/138 |
| 3,885,314 | 5/1975 | Banas, Sr. | 33/138 |

Primary Examiner—Willis Little
Attorney, Agent, or Firm—Roylance, Abrams, Berdo & Goodman

[57] ABSTRACT

A squaring device comprises two reels of tape rotatably mounted on a support, the axes of rotation of the reels being inclined to each other to enable the tapes to be unreeled at an acute angle to each other. The two reeled tapes are connected by gearing to effect simultaneous unreeling of the tapes in a predetermined ratio to each other. Preferably this ratio is a linear function of the cosine of the acute angle whereby the device, or two of these devices connected together, can be used to form a right angled triangle in performing squaring operations, depending upon the linear function. In this way the squaring operation can be performed without the need to make measurements or perform calculations.

19 Claims, 10 Drawing Figures

TAPE SQUARE

FIELD OF THE INVENTION

This invention relates to squaring devices for wall squaring, foundation squaring and the like, and in particular relates to squaring devices employing reels of tape.

BACKGROUND OF THE INVENTION

Layout instruments, including squaring devices, are known for squaring the positioning of walls, laying out and squaring building foundations, squaring framework etc. It has been proposed to mount two or more measuring tapes on a common support to provide various instruments and devices for this purpose.

However, these prior proposals in general involve procedures that require a level of trained skill, such as effecting accurate measurements, making calculations, having a knowledge of the 3-4-5 triangle, etc.

SUMMARY OF THE INVENTION

An object of the present invention is to provide a squaring device that requires no trained level of skill in performing squaring operations.

Another object of the present invention is to provide a compact squaring device which is convenient to transport and can be used in many situations.

A feature by which these objects are achieved is the gearing together of two reeled tapes so that when one tape is unreeled the other simultaneously unreels at a predetermined rate with respect to the one. This provides the advantage that the tapes are automatically extended the correct lengths in relation to each other when performing a squaring function.

Another feature of the invention is having an acute angle between the tapes and extending one tape at a rate which is a function of said acute angel with respect to the rate of extension of the other tape. This has the advantage of enabling a right angled triangle to be produced by arranging this function to be either the cosine or twice the cosine of the acute angle, depending upon whether one or two such devices are to be used.

Accordingly, therefore, there is provided by the present invention a squaring device comprising two reels of tape or the like rotatably mounted on a support, the axes of rotation of the reels being inclined to each other to enable the tapes to be unreeled with an acute angle between them. The tapes are operatively connected by gearing to effect simultaneous unreeling of the two tapes in a predetermined ratio to each other.

Preferably the tapes are directly connected together by the gearing as or just after the tapes exit from the reels; alternatively or in addition rotatable shafts on which the reels can be mounted may be geared together.

Preferably, the predetermined ratio is a linear function of the cosine of said acute angle.

One such device can be used to create a right angled triangle, in which case the predetermined ratio can be equal to the cosine of said acute angle.

On the other hand, two such devices may be used in which case the acute angles of the two are complementary angles and the predetermined ratio may be twice the cosine of the respective acute angle. The two devices may share a common tape or a tape from each device may be provided with means for connecting the ends of these tapes together.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
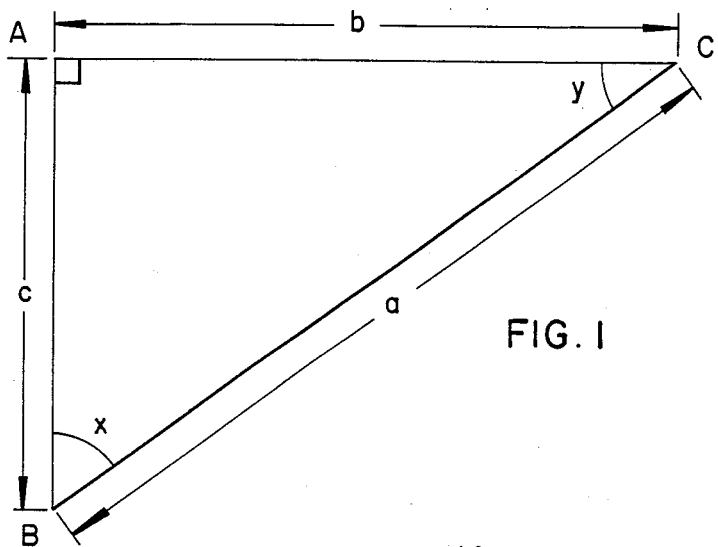
FIG. 1 is a diagram illustrating a principle utilized by the present invention.

FIG. 1 illustrates the principle used in squaring a building, the layout of a building, framework etc. A, B and C are the corners of a right angled triangle having a right angle at the corner A, acute angles x and y at the corners B and C, respectively, and the lengths of the sides opposite the corners A, B and C are a, b and c, respectively. As is well known $a^2=b^2+c^2$. Also, as is well known, if c equals 3 units and b equals 4 units, then a will equal 5 units. Frequently a carpenter, brick layer, etc. will make a triangle in wood with the sides measuring 3, 4 and 5 units, respectively, to obtain a square for use in squaring work being performed. It is observed that with any right angled triangle $$b = a \cosine y$$

$$c = a \cosine x$$

A first embodiment of the invention will now be described with reference to FIGS. 2 and 3.

Figure 2:
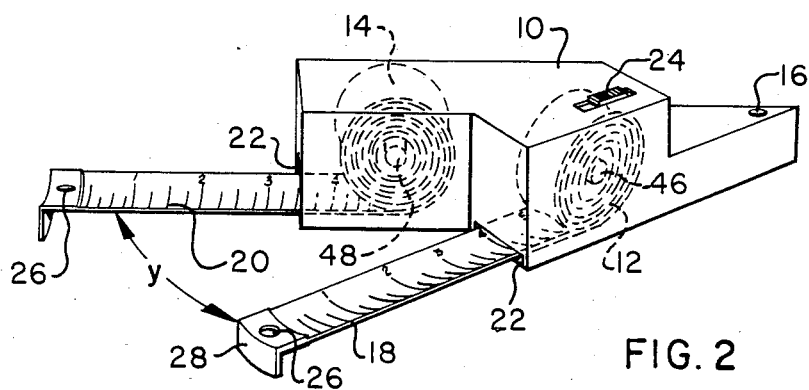
FIG. 2 is a diagrammatic perspective view of an embodiment of a tape square device according to the present invention.

FIG. 2 shows a tape square, or squaring device, having a support housing 10 in which is rotatably mounted a pair of tape reels 12, 14. The housing 10 has a flat base and is somewhat wedge shaped. Adjacent the apex of the wedge shape is a bore 16 by means of which the housing can be secured to a flat surface, for example by a nail. The tape reels are rotatable about axes parallel to the housing base and which intersect in an acute angle. The tape 18 of the tape reel 12 is extendable from the housing 10 through an aperture 22 in part of the front thereof. The other tape 20 is extendable through a similar aperture 22 in an adjacent part of the front of the housing 10. The tapes 18 and 20 extend from the housing at an acute angle y therebetween. In other words, when the tape square is positioned at corner C in FIG. 1, the tapes 18, 20 extend along the sides CB, CA, respectively. The tape reels 12, 14 are geared together so that when either tape is pulled out, the other tape also unreels and extends a predetermined length. The gearing arrangement is such that tape 20 extends twice the extended length of tape 18 times the cosine of the included angle y between the two tapes. The tape reels 12, 14 can be spring loaded for self return and provided with locking slides to lock the tape in the extended position, as is well known with steel measuring tapes. Due to the gearing between the two tapes, it is only necessary to provide the tape reel 12 with a locking slide 24, locking of reel 12 automatically locking (and subsequently releasing) the other reel 14. The free ends of each tape 18, 20 is provided with a hole 26 for securing that end in a chosen extended position, e.g. with a nail. Also, the free ends of the tapes may be provided with a lip 28 for latching that end in position.

To perform a squaring operation a pair of these tape squares are employed, both tape squares being the same except the other of the pair has an included angle x between its tapes, x plus y being a right angle, i.e. x and y are complementary angles.

Figure 3:
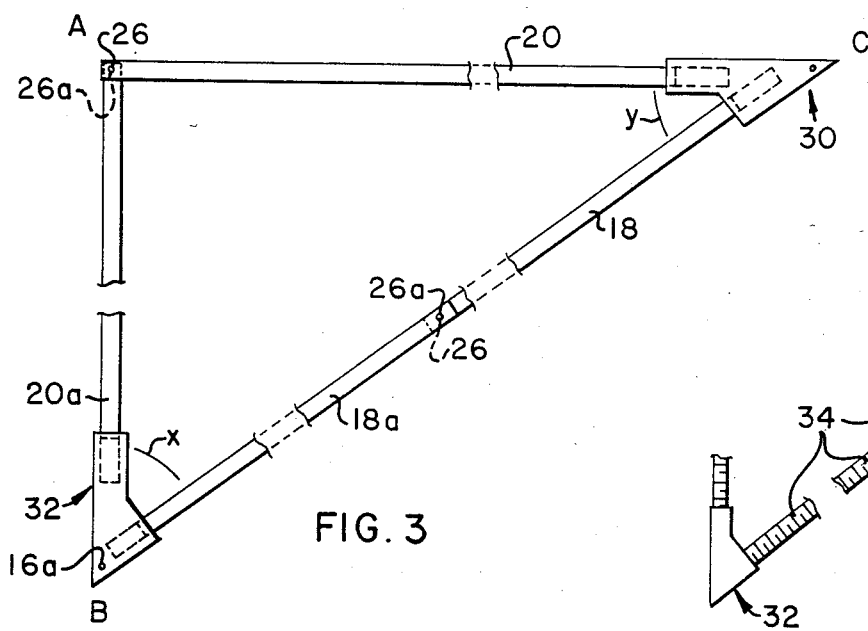
FIG. 3 is a plan view of a pair of tape square devices according to the invention in use.

FIG. 3 illustrates the pair of tape squares being used. The tape square 30 is the same as that shown in FIG. 2, and the other tape square 32 is similar but has the included angle x between its tapes 18a, 20a and these tapes 18a, 20a are reversed in orientation to the tapes 18, 20. The tape square 30 is secured by nailing its housing at the corner or along one side of a floor, wall, foundation, slab form, etc. to be squared. The tape 20 is pulled out along the wall, side etc. to be squared from, the length so extended is immaterial and a matter of choice and convenience. The tapes are locked in this extended position by actuating the locking slide 24. The extended length of tape 18 is noted; in this respect, it is preferable to have a progressive series of graduation markings along the tape 18 with the free end starting at zero. The complementary tape 18a of the other tape square 32 is then pulled out an amount equal to the noted extended length of tape 18; again, tape 18a is preferably marked with identical graduation starting at zero at the free end of the tape. The extended end of the tape 18a is then connected to the extended end of the tape 18, for example by passing a nail or clip through the overlying holes 26a, 26 at their ends. Extension of the tape 18a also causes the other tape 20a of the tape square 32 to be extended a predetermined distance, and these tapes are locked in their extended positions. The free end of the tape 20a is then positioned over the free end of the tape 20 and secured thereto and in position A by nailing through the holes 26, 26a in the tape ends. The tape square 32 is moved as necessary to accomplish this. Next, the tape square 32 is moved until the connected tapes 18, 18a and the tape 20a are all tight, whereupon the tape square 32 is secured in position by nailing through the hole 16a in its housing. The angle at A between tapes 20 and 20a is a right angle and the squaring of AB to AC is now established. In this respect it should be noted that as the extended length of tape 18 equals the extended length of tape 18a, twice the extended length of tape 18 or 18a equals BC. Hence, from the gearing arrangement relationship above, AC equals BC cos y and AB equals BC cos x, so that ABC is a right angle triangle right angled at A.

It should be noted that there is no need to have a measurement along either tape 20 or tape 20a to perform the squaring operation. Further, the graduation markings along the tapes 18 and 18a can be in any form or type of scale, and as these are identical starting from the free ends of these tapes, it is only necessary for a user to note the graduation mark on extended tape 18 and extend tape 18a to that same graduation mark without understanding the significance of that graduation mark.

By way of illustration, if the well known 3-4-5 triangle is to be created, the gearing in tape square 30 between the tape reels 12, 14 would be such that 4 units of tape 20 would extend for every $2\frac{1}{2}$ units of tape 18, thus the gear ratio of reel 14 to reel 12 would be $4\times 2/5$ i.e. 1.6. Similarly, the gearing in the tape square 32 would be such that 3 units of tape 20a would extend for every $2\frac{1}{2}$ units of tape 18a, the gear ratio of tape 20a to tape 18a being 1.2.

The free ends of the tapes 18 and 18a can have any convenient securing means for releasably connecting then together. In place of the holes 26 and lips 28, the tapes 18, 18a could be provided at their ends with a hook and eye arrangement. Whatever end securing means is employed, the graduated scales on the tapes should have their zero marks positioned to compensate for any overlap of the free end of the tapes 18, 18a.

Figure 4:
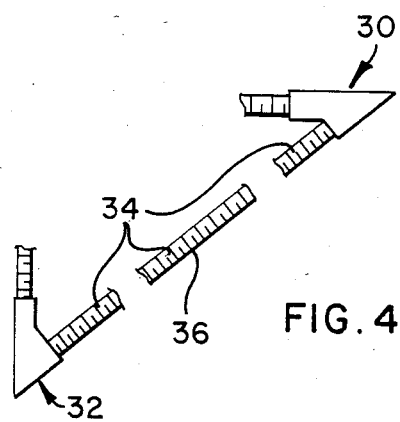
FIG. 4 illustrates a modification of the pair of tape square devices of FIG. 3 by which they are permanently connected.

FIG. 4 shows a modification of the pair of devices 30, 32 of FIG. 3 whereby the tapes 18 and 18a are permanently joined together to form a single continuous tape 34 having a zero mark 36 at its center. The spring loaded tape reels on which the opposite ends of the common tape 34 are wound in the devices 30, 32, respectively, are arranged to stop retraction of the tape 34 during rewinding so that the zero mark 36 remains a short distance outside the housing of each device 30, 32. This embodiment has the advantage that the step of connecting two tapes is eliminated, and the pair of tape squares 30, 32 cannot be separated from each other. Otherwise, use is the same as described with respect to FIG. 3 with the common tape 36 first being pulled out of device 30 and then being pulled out of device 32 an equal amount.

Figure 5:
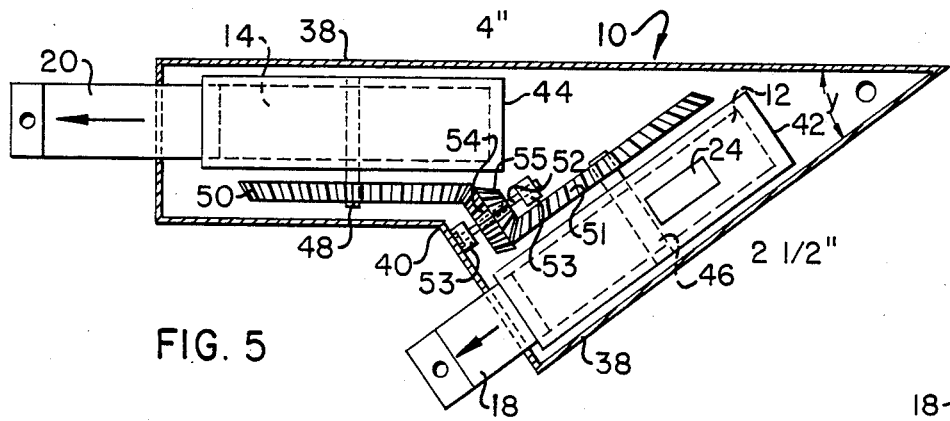
FIG. 5 is a top plan view of the tape square device of FIG. 2 with the top cover removed and the side walls in section.

FIG. 5 shows the gearing arrangement between the tape reels 12, 14 of FIG. 2, and is a top plan view with the top wall of the housing 10 removed and the side walls 38 and front wall 40 sectioned to expose the interior. The spring loaded steel tapes 12, 14 are encased in steel cases 42, 44, respectively, which are rigidly attached to the base of the housing 10. The tape reels 12, 14, which are concealed by their cases 42, 44, are mounted on rotatable shafts 46, 48 (see also FIG. 2). A toothed bevel gear wheel 50 is firmly secured on an end of the shaft 48 which protrudes through the casing 44.

A second bevel gear 51 is firmly secured to an end of the shaft 46 protruding through the other casing 42. The bevel gear 51 has the same effective diameter as the bevel gear 50. Freely rotatable of a short shaft 52, journaled in bearing blocks 53 mounted in the housing 10, are two smaller bevel gears 54, 55 meshing respectively with the bevel gears 50, 51. The bevel gears 54 and 55 are securely connected together to rotate in unison with the gear 54 having an effective diameter 2 cos y times the effective diameter of the gear 55. Thus, whenever the tape 18 is withdrawn from or reeled into the housing 10, the shaft 46 of the reel 12 rotates the gear 51, so rotating the shaft 48 through the gears 55, 54 and 50; this causes the tape 20 to unreel a length equal to 2 cos y times the length of tape 18 withdrawn. The lengths of the sides of the housing 10 adjacent and parallel to the tapes 18, 20 are also in the ratio 1:2 cos y. The angle y can be of any suitable value, for example in the range 30 to 60 degrees. In the case when ABC is a 3-4-5 right angled triangle, y is approximately 37° and ratio of the gearing between the reel 12 and the reel 14 is 1:1.6. In use either tape 18 or 20 can be pulled to unreel the other tape, and when unreeling of one tape is completed, it is preferable to lightly tension the other tape to ensure there is no slack left in the reel thereof.

It will be noted that by confining the gearing arrangement to the space between the two reel units, each reel unit and consequently each tape 18, 20 can be disposed closely adjacent the respective side wall of the housing 10.

Figure 6:
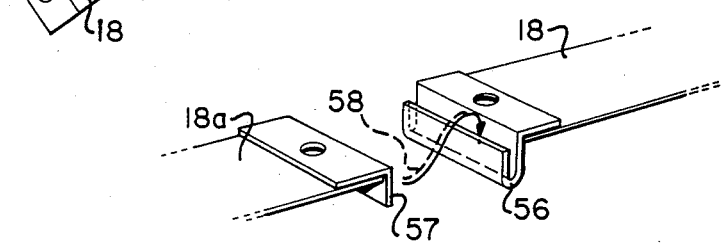
FIG. 6 is a perspective view illustrating a form of connection between the hypotenuse tapes of the device of FIG. 3.

FIG. 6 shows a particular manner of forming connectable ends of the tapes 18 and 18a of the two complementary units 30, 32, respectively. The end of the tape 18 is provided with a hook-shaped clip 56 in which can be latched a flange 57 on the end of the tape 18a, as indicated by the broken line arrow 58.

Figure 7:
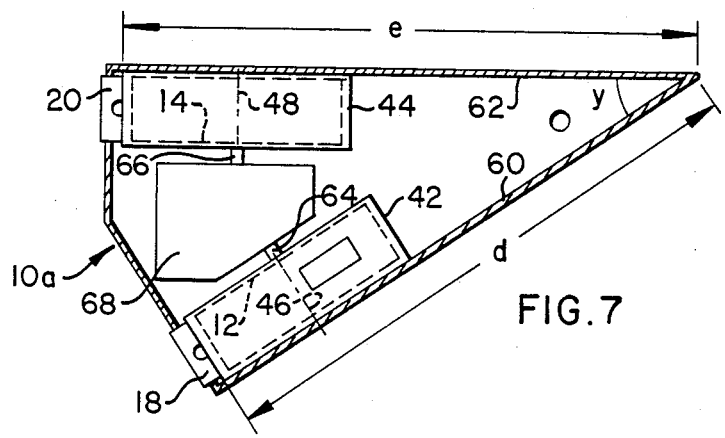
FIG. 7 is a top plan view similar to FIG. 5 of another embodiment of a tape square device according to the invention.

FIG. 7 shows another gearing arrangement between the tape reels 12, 14, particularly advantageous when it is desired to keep both tapes 18, 20 closely adjacent the diverging side walls 60, 62 of the housing 10a. An end 64,66 of each reel shaft 46, 48 protrudes from the respective reel casing 42, 44 inwardly into a sealed gear box 68 secured to the base of the housing 10a between the two reel casings 42, 44. The shaft ends 64, 66 form the input and output drives of the gear box 68 which provides the appropriate gear ratio between the tape reels 12, 14. The side walls 60, 62 intersect at the angle y, and similarly the axis of the shafts 46, 48, which are perpendicular to the side walls, intersect at the same angle. The effective length d of the side wall 60 to the length e of the side wall 62 is in the ratio 1:2 cos y. Thus, in the case of ABC being a 3-4-5 triangle, the angle y is approximately 37° and d:e=2½:4. This tape square, and also that of FIG. 5, correspond to the device 30 in FIG. 3; the tape square corresponding to the other device 32 in FIG. 3 would have the side walls inclined at the angle x, and the lengths of the sides would be in the ratio 1:2 cos x.

In the above embodiments, if the tapes are of noticeable thickness and or are capable of extending considerable lengths, then it is preferable to have the tape that extends the lesser amount thicker than the other tape which extends the greater amount. The thickness of the shorter tape to that of the longer tape should be in the inverse ratio to their respective lengths of extension. For example, thickness tape 18 to thickness tape 20 equals 2 cos y:1, thickness tape 18a to thickness tape 20a equals 2 cos x:1.

FIG. 7 illustrates the preferred embodiment of the invention only requiring one tape square device 70. This device 70 is similar to the tape square device 30 previously described, except the gear ratio between the two tape reels is 1:cos y, and the lengths of the sides adjacent the tapes 18b and 20b would be in the ratio 1:cos y. Thus, when the tape 18b is pulled or unreeled from the housing 10b, the other tape 20b unreels a length equal to cos y times the extended length of tape 18b. The free end 72 of tape 18b is cut at an angle x (the complement of y) and the free end 74 of tape 20b is cut square. By striking a straight chalk line between the ends 72, 74, the chalk line will be at right angles to the tape 20b due to the gearing between the two tapes. Thus, in use, to square from a wall or other boundary, the device 70 is placed adjacent the boundary and the tape 20b extended the desired distance along the boundary. A chalk (or other) line is then struck between the ends 72, 74 to complete the squaring operation. Unless the tape 20b is also being used as a measure to locate the location at which squaring is to be performed, it will be appreciatd that with this embodiment neither tape 18b nor tape 20b requires scale graduations and no scale readings or markings have to be observed.

Figure 9:
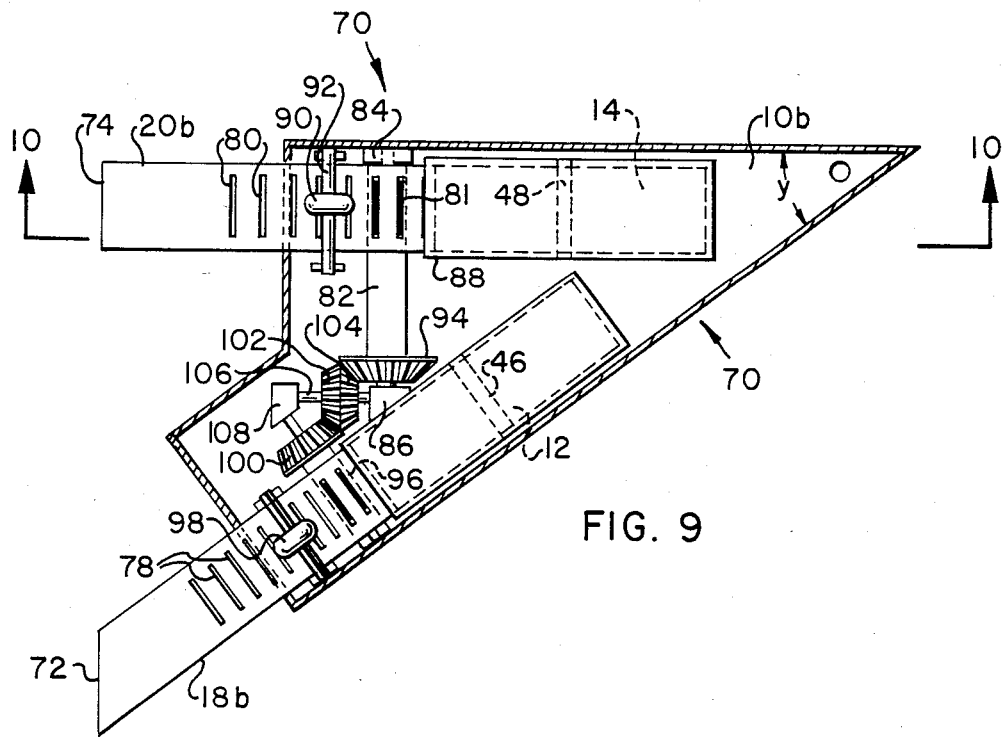
FIG. 9 is a view similar to FIG. 5 of the embodiment of FIG. 8.
Figure 10:
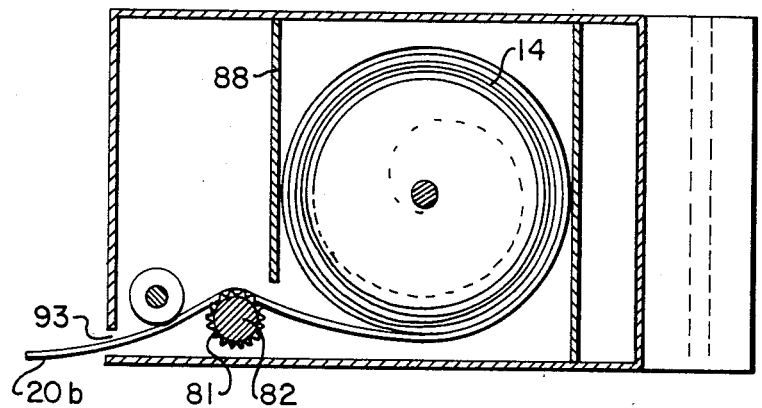
FIG. 10 is a section on the line 10—10 of FIG. 9.

FIGS. 9 and 10 illustrate the preferred gearing connected between the two reels 12, 14 of the single tape square device 70 of FIG. 7. This preferred form of gearing arrangement of FIG. 9 could also be advantageously employed, with suitable adaptation and appropriate gear ratio, in any of the previously described embodiments.

Figure 8:
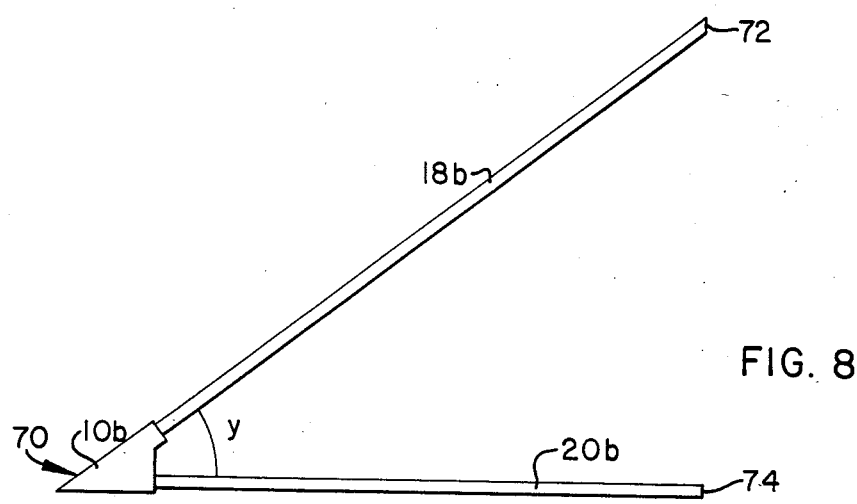
FIG. 8 is a view similar to FIG. 3 and illustrating another embodiment of the invention.

In FIG. 9, the device 70 has been turned around through 180° from the position shown in FIG. 8. Instead of connecting the shafts 46, 48 of the tape reels 12, 14 to operatively gear the two tapes together, in this embodiment the two tapes 18b, 20b are directly geared together externally of the reels 12, 14. The tapes 18b, 20b each have a series of parallel, equi-spaced apertures 78, 80, respectively, therein. The apertures 80 engage over teeth 81 positioned intermediate the length of a shaft 82 rotatably mounted in bearing blocks 84, 86 below the tape 20b immediately after its exit from the rectangular case 88 in which the reel 14 is mounted, see also FIG. 10. A rubber roller 90 is freely rotatably mounted on a shaft 92 above the tape 20b and a short distance in front of the toothed shaft 82 just prior to the tape 20b exiting through the aperture 93 (see FIG. 10) in the front wall portion of the housing 10b. The rubber roller 90 presses the tape 20b downwardly to ensure the teeth 81 on the shaft 82 engage through the apertures 80 to form a positive driving relationship with the tape 20b. A bevel gear 94 is rigidly mounted on the inner end of shaft 82 adjacent the bearing block 86. A similar toothed shaft 96 and a rubber roller 98 are mounted below and above, respectively, the other tape 18b with the teeth of the shaft 96 drivingly engaging through the apertures 78. A bevel gear 100 is mounted on the inner end of shaft 96, the gear 100 being smaller in effective diameter, and so having less gear teeth, than the gear 94. The gears 100 and 94 are drivingly connected by a pair of bevel gears 102, 104 mounted on a shaft 106 rotatably supported in bearing housings 86, 108. The gears 102, 104 are the same size and are mounted back to back to rotate in unison.

In operation, when the tape 74 is pulled out of the housing 10b, the slot-like apertures 80 successively engage the teeth 81 to positively rotate the shaft 82. This in turn rotates the shaft 96 through the bevel gears 94, 104, 102, 100, and the teeth of the shaft 96 drivingly engage the apertures 78 to positively extend the tape 18b from the housing 10b. The ratio of the length of tape 18b extended to that of tape 20b is the ratio of the size of the gear 94 to that of the gear 100. This ratio is chosen as 1:cos y, y as before being the acute included angle between the two tapes. As before, the lengths of the sides of the housing 10b define the angle y and are in the same ratio as that by which the tapes adjacent these sides extend. When the lock on the reel 12 is released, the spring-loaded reel 12 reels up the tape 18b and through the gearing 100, 102, 104, 94 also withdraws the tape 20b into the housing 10b and onto its reel 14. It will be apparent that when either tape is manually extended the other tape will also be extended in a predetermined ratio. With this preferred gearing arrangement, the relative thicknesses of the two tapes is immaterial.

Thus, according to the invention the gearing operatively connected between the two tapes of the or each squaring device, to effect simultaneous unreeling thereof, can be between shafts on which the reels are mounted or, preferably, between members acting directly upon the tapes externally of the reels.

From the above description, it will be apparent that there are a number of advantages associated with using a device of the present invention. One person can utilize the device by himself for squaring on a flat surface. Once the or each tape reel has been locked with the tapes extended, the triangle so formed can be shifted to various positions to determine placement of a rectangle, e.g. a building foundation with respect to already known lot boundaries. The device is much more compact and inexpensive than a transit and can be used in spaces where it is not practical to use a transit. The device can be used for squaring the inner walls of a building. No knowledge of squaring, 3-4-5 triangles, or computing is necessary for the user. In the absence of a level, the device could be used to establish plumb by locking into position and using vertically. Broken tapes can be replaced in the same manner as traditional spring loaded carpenters' tapes.

The above described embodiments, of course, are not to be construed as limiting the breadth of the present invention. Modifications, and other alternative constructions, will be apparent which are within the spirit and scope of the invention as defined in the appended claims.

What is claimed is:

1. A squaring device, comprising:
a support;
two reels of tape, said reels each being rotatable about a separate axis and mounted on said support with the axes of the two reels inclined to each other to enable a tape to unreel from each reel with an acute angle between the two tapes; and
gearing operatively connected between the two tapes to effect simultaneous unreeling thereof, whereby the two tapes unreel in a predetermined ratio to each other,
wherein said gearing has a gear ratio which is a function of said acute angle.

2. The squaring device of claim 1, wherein said gearing causes one tape to unreel a length equal to the cosine of said acute angle times the length unreeled of the other tape.

3. The squaring device of claim 1, wherein said gearing causes one tape to unreel a length equal to the cosine of said acute angle times twice the length unreeled of the other tape.

4. The squaring device of claim 1, wherein said reels are mounted on rotatable shafts connected by said gearing.

5. The squaring device of claim 4, wherein said gearing is contained in a gear box located between said reels.

6. The squaring device of claim 1, wherein said gearing is connected between members acting directly upon said tapes externally of said reels.

7. The squaring device of claim 1, wherein said support comprises a housing including two side walls which intersect in an angle equal to said acute angle, and the length of one of said walls bears said predetermined ratio to the length of the other of said walls.

8. The squaring device of claim 6, wherein each reel is disposed adjacent a respective one of said side walls with the rotatable axis of that reel being perpendicular to said respective one side wall.

9. The squaring device of claim 1, wherein at least one of said reels is self reeling and includes means for locking the tape of that reel in an unreeled position.

10. The squaring device of claim 1, including means for temporarily anchoring said support to a surface on which it is placed.

11. The squaring device of claim 1, wherein said acute angle is 37 degrees and said gearing causes one tape to unreel four units of length for every two and one half units of length of the other tape.

12. The squaring device of claim 1, wherein said acute angle is 53 degrees and said gearing causes one tape to unreel three units of length for every two and one half units of length of the other tape.

13. The squaring device of claim 1, wherein said acute angle is 37 degrees and said gearing causes one tape to unreel four units of length for every five units of length of the other tape.

14. The squaring device of claim 4, wherein the two tapes have different thicknesses, the ratio of the thickness of one tape to the other being the inverse of said predetermined ratio of unreeling of said one tape to the other.

15. A squaring device, comprising:
two supports;
a pair of reels of tape mounted on each support;
the reels of each said pair of reels being rotatable about separate axes which are inclined to each other to enable the tapes of each respective pair of reels to unreel with an acute angle therebetween;
the acute angle between the tapes of one pair of reels and the acute angle between the tapes of the other pair of reels being complementary angles;
the tapes of each said pair of reels being operatively connected together by gearing to effect simultaneous unreeling of the two tapes of the respective pair of reels;
each said gearing having a gear ratio equal to twice the cosine of the acute angle between the tapes operatively connected thereby; and
one tape of one said pair of reels being connected in use to a corresponding tape of the other said pair of reels, whereby when said one and said corresponding tapes are unreeled equal distances and form a straight line the two remaining tapes of the two pairs of reels form a right angle.

16. The squaring device of claim 15, wherein said one and said corresponding tapes are integrally connected together.

17. The squaring device of claim 15, wherein said one and said corresponding tapes are separate and include means for enabling releasable connection thereof together.

18. A squaring device, comprising:
a housing having a wedge-shaped base with two side walls intersecting at an acute angle and a front wall connecting said side walls;
a pair of reels of tape mounted on rotatable shafts supported in said housing, each shaft being rotatable about an axis perpendicular to a respective one of said side walls, the shaft axes being parallel to said base and at an angle to each other equal to said acute angle;

apertures in said front wall through which the tapes extend from said reels at said acute angle to each other;

two rotatable drive members respectively engaging the two tapes;

gearing rotatably connecting said drive members to effect simultaneous unreeling of said tapes from said pair of reels, said gearing causing the tape from one reel to unreel at a predetermined ratio with respect to the other tape; and said predetermined ratio being a linear function of the cosine of said acute angle.

19. The squaring device of claim 18, wherein said gearing comprises two gears meshing respectively with two further gears therebetween, said two further gears being connected together for rotation in unison, and said drive members have teeth engageable in apertures in said tapes.

* * * * *